UNITED STATES PATENT OFFICE.

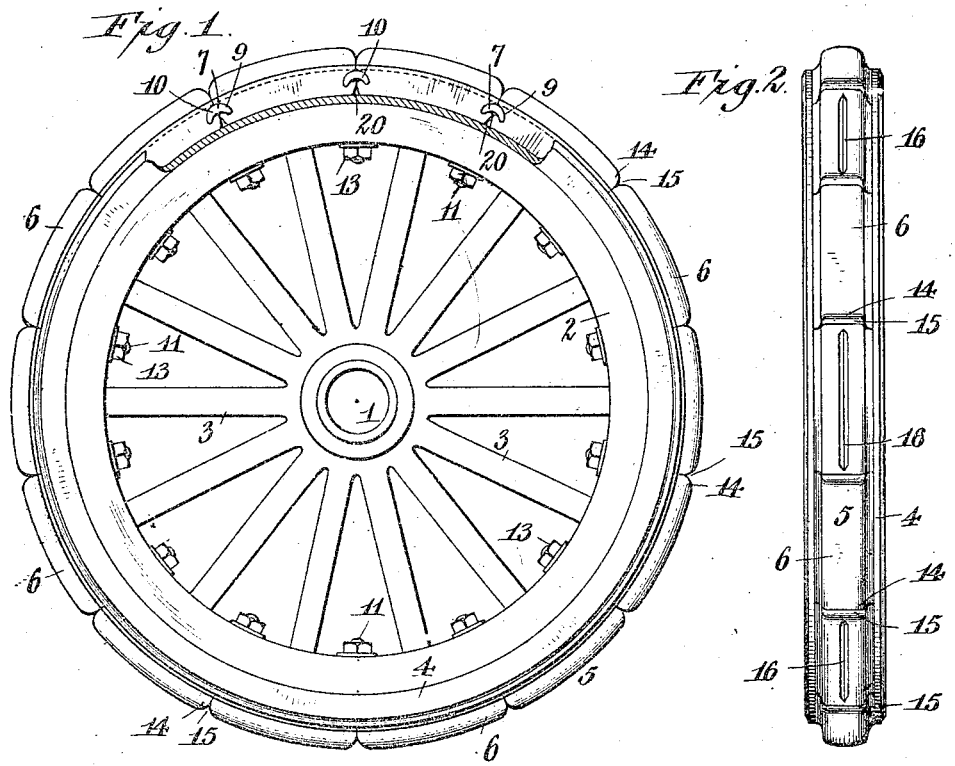
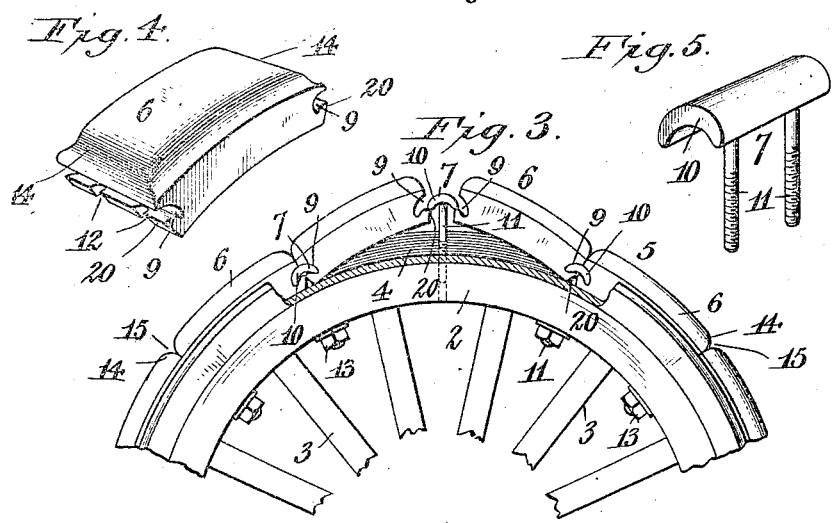

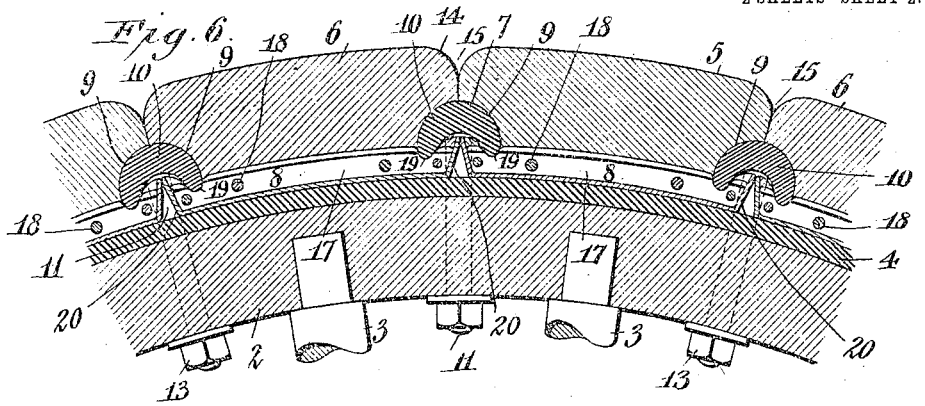
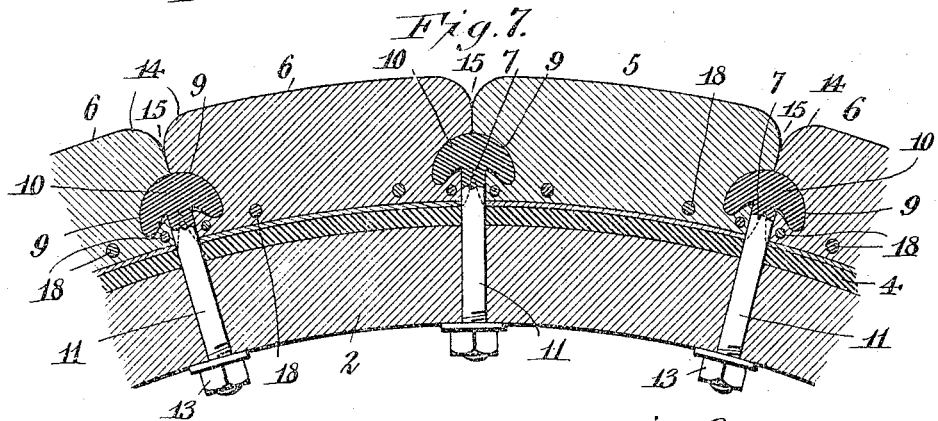
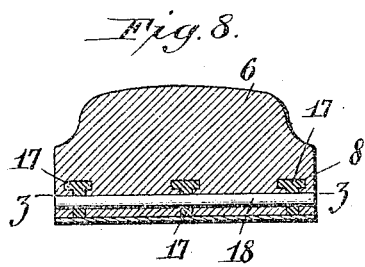
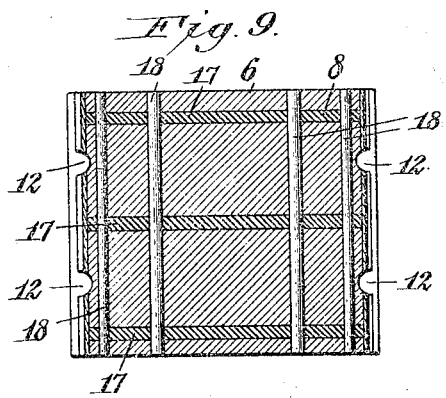
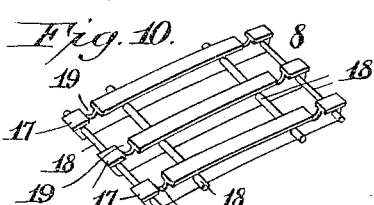

JOHN ECKHARD, OF BUFFALO, NEW YORK.

VEHICLE-TIRE.

No. 873,738.   Specification of Letters Patent.   Patented Dec. 17, 1907.

Application filed April 7, 1906. Serial No. 310,554.

*To all whom it may concern:*

Be it known that I, JOHN ECKHARD, a citizen of the United States, residing at Buffalo, in the county of Erie and State of New York, have invented certain new and useful Improvements in Vehicle-Tires, of which the following is a specification.

This invention relates to vehicle-wheels and more particularly to the tires thereof and the manner of attaching the same to the wheel-felly.

The primary object of my invention is the production of a wheel-tire having a series of connected parts or members placed around the wheel-felly and connected thereto, and which embodies improved means for detaching two adjoining parts of the series without disturbing any of the remaining parts.

Another object is to provide a multi-part tire with end connections and securing means which on being detached, act against the adjacent ends of two adjoining parts to elevate the same and permit their removal from the wheel without disturbing the remaining parts.

Further objects are, to embed within the tire-parts, metallic or other rigid reinforcing means, to provide securing means and notches within the tire-parts for the reception of securing means engaging against the reinforced portions of the tire-parts; and to otherwise improve on solid rubber wheel tires now in use.

This invention primarily consists of a multi-part tire having combined connecting and securing devices, and it further consists in the construction, arrangement, and combination of parts to be hereinafter described and particularly pointed out in the subjoined claims.

In the drawings,—Figure 1 is a sectional elevation of a vehicle-wheel equipped with my improved tire. Fig. 2 is a face view of the same. Fig. 3 is a sectional elevation of a portion of a wheel, showing the manner of removing the tire-parts or members. Fig. 4 is an enlarged detached perspective view of one of the tire-members. Fig. 5 is a detached perspective view of one of the combined connectors and fasteners for the tire-members. Fig. 6 is an enlarged central longitudinal section through a portion of the rim and tire. Fig. 7 is an enlarged longitudinal section through a portion of the rim and tire, taken to one side of the longitudinal center of the tire to show the securing bolts of the combined connectors and fasteners for the tire-members. Fig. 8 is a transverse section of one of the tire-members. Fig. 9 is a transverse longitudinal section of one of the tire-members, taken on a plane indicated by line z—z, Fig. 8. Fig. 10 is a perspective view of the reinforcing-device embedded in each of the tire-members.

Referring to the drawings in detail, corresponding numerals of reference refer to corresponding parts in the several figures.

The reference numeral 1 designates the hub of the wheel, 2 the rim or felly, and 3 the spokes connecting the hub and rim, all of which are of common construction, and may be of any desired design.

A channeled tire retaining-member 4 is secured to the face of the wheel-felly in any practicable manner, and within said retaining-member I place my improved multi-part tire 5. The various parts or members of the tire are designated by the numeral 6; they being connected and secured to the wheel-felly by combined connectors and fasteners 7. As this tire is particularly designed for general use, the parts thereof are molded from rubber, and the base reinforced with metallic or other reinforcing-devices 8, for the purpose of rendering the parts rigid where they are connected with, or in contact with the other parts of the wheel. By reinforcing the base only, the tire-parts retain their resiliency where needed.

In the particular embodiment of my invention illustrated, the tire-parts or members have their ends provided with curved undercut grooves 9 into which fit the crescent-shaped connectors 10 having each two radially disposed fastening bolts 11 which fit within notches 12 in the ends of the tire-parts and extend through perforations in the tire retaining-member and the wheel-felly; the inner projecting ends thereof having nuts 13 applied thereto. The outer transverse edges 14 of the tire-members are curved to provide transverse depressions 15 for the purpose of increasing the traction; but if desired the ends may be at a sharp angle with the tread, in which cases the tires have the appearance of a one-piece tire. As shown in Fig. 2, several of the tire-members may be grooved longitudinally, as at 16, to prevent skidding or lateral slipping.

The reinforcing devices embedded in the base of the tire-members, comprise longitudinal T-bars 17 extending from end to end, and transversely disposed wires or small bars 18 extending from edge to edge and passing through perforations in the longitudinal T-bars. Near their ends, the T-bars 17 are notched, as at 19, to conform to the curved undercut grooves 9, and fitting into said notches are the edges of the connectors 10. By this construction, the connectors bear against the metallic reinforcing-devices, and wearing of the rubber at this point is entirely obviated. Manifestly bars of different cross-section may be substituted for the T-bars of the reinforcing-devices, and changes may be made otherwise in the construction of said devices without detracting from the utility of the same. The ends of the tire-members between the notches 9 therein and the curved inner bearing surface are beveled, as at 20, for a purpose to appear presently.

In applying the tire-members to the wheel, two members are connected and placed within the tire retaining-member, the fastening bolts being passed through the retaining-member and the wheel-felly and the nuts applied thereto; the remaining tire-members may be connected to opposite ends of the first two members applied and secured in the manner stated. The last two members are to be inclined in the manner shown in Fig. 3, and the elevated ends gradually lowered carrying the connector with them to cause the same to enter the grooves in the ends of the members. As the tire-members are forced inward, the beveled portions 20 at the ends provide the necessary clearance, and as compression of the rubber at the base of the members is impossible, by reason of the reinforcing-device being embedded therein, said beveled portions are essential to easy application. When said members are seated within the tire retaining-member and the nuts applied to the bolts, the tire is as effectively held as any one-piece tire.

In removing the tire or any member of the tire, the nuts of the bolts on the connectors are removed and the latter forced outward, which causes adjacent ends of two adjoining members to move outward with the connector, in the manner shown in Fig. 3. When the connectors are free of the grooves 9 in the tire-members, the latter may be easily removed. In this manner, any worn member or members may be easily replaced with a new member or members without removing any of the other members.

Many changes in construction, form, disposition, and location of parts may be resorted to without departing from my invention or sacrificing any of the advantages thereof.

Having thus described my invention, what I claim is,—

1. A tire for wheels comprising a retaining-member held to the felly of the wheel, a multi-part tire within said retaining-member and each of the parts thereof having curved undercut grooves in the ends thereof, combined connecting and fastening-devices between the several parts of the tire comprising each a crescent-shaped transversely-disposed connector fitting the grooves in adjacent ends of two adjoining blocks and fastening bolts on said connector passing through said retaining-member and the felly of a wheel.

2. A multi-part tire having a reinforcing-device embedded in the base of each part, said reinforcing-device consisting of longitudinally-disposed members having apertures at intervals and transversely-disposed members passed through said apertures.

3. A multi-part tire having a reinforcing-device embedded in the base of each part, said reinforcing-device consisting of longitudinally-disposed members of T-formation in cross-section having apertures at intervals and transversely-disposed members passed through said apertures.

4. The combination with the wheel-felly, of a multi-part tire having a reinforcing-device embedded in each part thereof and having the ends of the parts provided with grooves, said reinforcing-devices including longitudinally-disposed bars extending from end to end of the tire-parts and connecting and fastening-devices between the tire-parts having each a transversely-disposed member entering the grooves in adjacent ends of two adjoining parts and bearing against the longitudinally-disposed bars of the reinforcing-devices in said parts, and bolts on said transversely-disposed members for securing the tire-parts to the wheel-felly.

5. The combination with the wheel-felly, of a multi-part tire having a reinforcing-device embedded in each part thereof and having the ends of the parts provided with curved undercut grooves, said reinforcing-devices including longitudinally-disposed bars extending from end to end of the tire-parts and having notches near their ends to correspond with the grooves in the ends of the tire-parts, and connecting and fastening-devices between the tire-parts having each a transversely-disposed member crescent-shaped in cross-section and inwardly disposed bolts, said crescent-shaped member entering the grooves in adjacent ends of two adjoining tire-parts and the notches in the longitudinally-disposed bars in said parts, and said bolts serving to secure the tire to the wheel-felly.

In testimony whereof, I have affixed my signature in the presence of two subscribing witnesses.

JOHN ECKHARD.

Witnesses:
  MAY F. SEWERT,
  EMIL NEUHART.